US007024466B2

(12) United States Patent
Outten et al.

(10) Patent No.: US 7,024,466 B2
(45) Date of Patent: Apr. 4, 2006

(54) NETWORK CONFIGURED FOR DELIVERY OF CONTENT FOR DOWNLOAD TO A RECIPIENT

(75) Inventors: Todd Avery Outten, Los Angeles, CA (US); Bryan Gentry Spaulding, San Francisco, CA (US); Scott Jeffrey Sherr, Brentwood, CA (US); Ira Steven Rubenstein, Los Angeles, CA (US); Yair Landau, Pacific Palisades, CA (US); Douglas Daiseung Chey, Santa Monica, CA (US); Michael R. Arrieta, Rolling Hills Estates, CA (US); Harish Mandyam, Playa del Rey, CA (US); Thomas M. Rodriguez, Culver City, CA (US)

(73) Assignee: Movielink, LLC, Santa Monica, CA (US)

( * ) Notice: Subject to any disclaimer, the term of this patent is extended or adjusted under 35 U.S.C. 154(b) by 718 days.

(21) Appl. No.: 09/827,481

(22) Filed: Apr. 6, 2001

(65) Prior Publication Data

US 2002/0069420 A1   Jun. 6, 2002

Related U.S. Application Data

(60) Provisional application No. 60/195,870, filed on Apr. 7, 2000, provisional application No. 60/273,444, filed on Mar. 5, 2001.

(51) Int. Cl.
  *G06F 15/16*   (2006.01)
(52) U.S. Cl. .................. 709/219; 709/203; 709/217; 709/229; 718/105
(58) Field of Classification Search ........ 709/200–203, 709/217–219, 226, 235, 238–239, 245, 225, 709/229, 246; 718/105
See application file for complete search history.

(56) References Cited

U.S. PATENT DOCUMENTS 5,210,829 A   5/1993   Bitner
(Continued)

FOREIGN PATENT DOCUMENTS

WO   WO 0059151   10/2000

OTHER PUBLICATIONS

PCT International Search Report as issued in International Application No. PCT/US01/11452, Mailing Date Nov. 8, 2001.
(Continued)

*Primary Examiner*—Bharat Barot
(74) *Attorney, Agent, or Firm*—Sidley Austin Brown & Wood LLP

(57) ABSTRACT

Network systems and processes for delivery of electronic content to recipient processors may be configured to facilitate the delivery of relatively large content items and/or a relatively large number of content items. In one example, a movie rental system and process delivers (downloads) movie files to customers across the Internet. System network architecture includes three or more layers of servers, including a main server supporting an interface for recipient processors to request content items, a plurality of parent servers, and a plurality of edge servers. Edge servers are distributed throughout a region in which the system provides content delivery services to recipient processors. Parent servers, spaced across the service region, support edge servers. A copy of each content item available through the service is distributed from the main server to each parent servers for storage. Parent servers distribute content to edges servers, pursuant to instructions from the main server or requests from the edge servers. The main server receives and processes requests for content items from recipient processors and directs recipient processors to edge servers for obtaining requested content items. The main server also authenticates licenses and publishes rules for the distribution of content items.

21 Claims, 10 Drawing Sheets

U.S. PATENT DOCUMENTS

| | | | |
|---|---|---|---|
| 5,261,072 A | 11/1993 | Siegel | |
| 5,400,402 A | 3/1995 | Garfinkle | |
| 5,511,208 A | 4/1996 | Boyles et al. | |
| 5,687,235 A | 11/1997 | Perlman et al. | |
| 5,734,719 A | 3/1998 | Tsevdos et al. | |
| 5,745,879 A | 4/1998 | Wyman | |
| 5,784,546 A | 7/1998 | Benman, Jr. | |
| 5,790,423 A | 8/1998 | Lau et al. | |
| 5,790,664 A | 8/1998 | Coley et al. | |
| 5,864,823 A | 1/1999 | Levitan | |
| 5,878,429 A | 3/1999 | Morris et al. | |
| 5,907,837 A | 5/1999 | Ferrel et al. | |
| 5,909,638 A | 6/1999 | Allen | |
| 5,933,498 A | 8/1999 | Schneck et al. | |
| 5,956,716 A | 9/1999 | Kenner et al. | |
| 5,966,440 A | 10/1999 | Hair | 380/4 |
| 6,006,264 A | 12/1999 | Colby et al. | |
| 6,014,651 A | 1/2000 | Crawford | |
| 6,055,314 A | 4/2000 | Spies et al. | |
| 6,055,566 A | 4/2000 | Kikinis | |
| 6,081,840 A | 6/2000 | Zhao | |
| 6,101,485 A | 8/2000 | Fortenberry et al. | |
| 6,122,648 A | 9/2000 | Roderick | |
| 6,170,014 B1 * | 1/2001 | Darago et al. | 709/217 |
| 6,173,311 B1 * | 1/2001 | Hassett et al. | 709/217 |
| 6,182,218 B1 | 1/2001 | Saito | |
| 6,185,619 B1 | 2/2001 | Joffe et al. | |
| 6,189,008 B1 | 2/2001 | Easty et al. | |
| 6,189,146 B1 | 2/2001 | Misra et al. | |
| 6,226,618 B1 | 5/2001 | Downs et al. | |
| 6,233,682 B1 | 5/2001 | Fritsch | |
| 6,236,805 B1 | 5/2001 | Sebestyen | |
| 6,268,856 B1 | 7/2001 | Bruck et al. | |
| 6,405,219 B1 * | 6/2002 | Saether et al. | 709/219 |
| 6,442,603 B1 * | 8/2002 | Borella | 709/218 |
| 6,678,793 B1 * | 1/2004 | Doyle | 709/226 |
| 6,751,673 B1 * | 6/2004 | Shaw | 709/217 |
| 6,785,704 B1 * | 8/2004 | McCanne | 709/203 |
| 6,816,882 B1 * | 11/2004 | Conner et al. | 709/203 |
| 6,874,015 B1 * | 3/2005 | Kaminsky et al. | 709/214 |
| 6,886,029 B1 * | 4/2005 | Pecus et al. | 709/203 |

OTHER PUBLICATIONS

PCT International Search Report as issued in International Application No. PCT/US01/11050, Mailing Date Oct. 10, 2001.

PCT International Search Report as issued in International Application No. PCT/US01/11124, Mailing Date Oct. 18, 2001.

* cited by examiner

US 7,024,466 B2
NETWORK CONFIGURED FOR DELIVERY OF CONTENT FOR DOWNLOAD TO A RECIPIENT

RELATED APPLICATIONS

This application claims priority to Provisional Application No. 60/195,870, filed Apr. 7, 2000, and to Provisional Application No. 60/273,444, filed Mar. 5, 2001, each of which is hereby incorporated by reference. The present invention also relates to U.S. patent application Ser. No. 09/603,805, filed Jun. 20, 2000 (for which a Petition to Convert Non-Provisional Application to Provisional Application Under 37 CFR 1.53(c)(2) was filed Mar. 16, 2001 is granted and provide Provisional Application No. 60/367,335, which is incorporated herein by reference and which forms a basis for priority. The present invention also relates to U.S. patent application Ser. No. 09/826,374, titled "Online Digital Video Signal Transfer Apparatus and Method," filed Apr. 4, 2001, still pending, which is incorporated herein by reference and which forms a basis for priority. The present invention also relates to U.S. patent application Ser. No. 09/827,469, titled "Secure Digital Content Licensing System and Method," filed Apr. 6, 2001, still pending; and U.S. patent application Ser. No. 09/828,406, titled "Website System and Process For Selection And Delivery of Electronic Information On A Network," filed Apr. 6, 2001, still pending, each of which is incorporated by reference in its entirety.

FIELD OF THE INVENTION

Embodiments of the present invention relate to systems and processes for delivery of electronic data to recipient processors over a network and, in particular embodiments, to systems and processes for delivery of digital encoded content files to users, such as motion picture files to rental customers over the Internet. Further embodiments relate to systems architecture and processes for facilitating the delivery of a large number of relatively large files to recipients over a network.

BACKGROUND OF THE INVENTION

The ability to deliver content over an electronic communications network has resulted in a variety of applications of network technology. In office environments, local area networks (LANs) are delivering software applications, electronic files and messages to office workers. LANs are used by businesses, military groups, educational facilities and other organizations to facilitate the delivery of many types of content between organization members. Wide area networks, such as the Internet, provide additional or larger scale opportunities to deliver content.

For example, the Internet is used by a variety of business, organizations, governments and individuals to deliver various types of content to Internet enabled devices, including website content for displaying a website on a user's computer, as well as digitally encoded content files. Some Internet websites provide opportunites to download files containing digitally encoded text (such as papers, forms, Patents), pictures, images or computer games. In some websites, larger files, such as video files, video games or music files may be downloaded by a user. As a result, a variety of content delivery services are presently provided over communication networks, such as the Internet.

The speed and efficiency at which network users may download content over a network can be largely dependent upon the size of the content files, the number of users simultaneously using the content delivery service and the speed and efficiency of the servers and other system components used by the content delivery service. As the number of users of a content delivery service increases, the delays experienced by users attempting to download content files can increase, unless the service operator provides sufficiently fast and efficent servers and other system components. However, robust servers and system components are expensive to obtain and operate. Thus, with many Internet sites, users may experience significant delays in downloading content files, especially during higher traffic periods and with sites that deliver large content files.

In addition, the delivery of large files can require a large storage capacity and bandwidth, as compared to smaller files. These factors can render conventional systems impractical for downloading large numbers of large files. Thus, typical conventional systems may be impractical or inefficient for providing large-scale services for delivery of large files, such as movie files, music files, video game files or other large program or data files, to users on a network. Accordingly, there is an industry demand for an efficient manner of providing an on-line service for deliverying large numbers of large files, for example, to many users over a wide region.

SUMMARY OF THE DISCLOSURE

Embodiments of the present invention described herein include network architecture systems and processes which address the above-noted industry demands.

Particular embodiments relate to systems and process for efficient delivery of electronic content to recipient processors over a network. Further embodiments relate to such systems and processes which facilitate the delivery of relatively large content items and/or a relatively large number of content items.

Yet further embodiments relate to such systems and processes configured for providing reliable and/or fast delivery of services and content.

One example embodiment relates to a movie rental system and process for delivering (downloading) movie files to customers across the Internet. In that example, the content may comprise at least one electronic, digital copy of a movie. Other embodiments of the invention may involve delivery of other types of content including, but not limited to, music files, still image files, game programs, or other software or data.

Systems and processes according to embodiments of the present invention employ a system network of servers connected for communication on a wide area network, such as the Internet, with recipient processors, for example, network enabled user network devices (UNDs). One example system network architecture includes three or more layers of servers. The three layers includes a main server layer having at least one main server system, a parent server layer having a plurality of parent server systems, and an edge server layer having a plurality of edge server systems. Additional servers, such one or more source servers and one or more special function server may be included in the system.

The edge servers are distributed throughout a region in which the system provides content delivery services to users on UNDs. Edge servers may be located in populated areas, such as in or near large cities. Parent servers may be spaced across the service region to provide support for edge servers. In one embodiment, content items are distributed to and stored on the parent and edge servers, from the main server. A copy of each content item available through the server may be stored by the main server and distributed to and stored by each parent server. The parent servers, in turn, distribute content items to edge servers, pursuant to instructions from the main server or requests from the edge servers. The edge servers need not store copies of all available content items. Instead, edge servers may store some content items, such as specific content items identified by the main server as "hot" content items, but not necessarily all other content items.

The main server system supports a website (or other interface) accessable to users on UNDs over a network, such as the Internet. The website may provide an interface for allowing users to select and request content items for downloading. The website may also provide a means for users to purchase a license to access requested content items.

Downloading every content item directly from the main server may require a very large and complex server (especially where the content items are relatively large and/or the number of content items is large). Accordingly, in some embodiments, the function of downloading content items to users is distributed among the edge servers. When a user purchases a license for a selected content item the main server provides the user's UND with a URL (uniform resource locator) that will allow the user to connect to an edge server to download an encrypted electronic file containing the selected content item. The user may input the URL to the user's web browser immediately or wait and download the content item at a later time. Alternatively, this URL can be provided transparently to the user's web browser to cause the download to begin immediately.

After a user has downloaded a content item and a purchased license, the user must enable the license before accessing the content item. The electronic file containing the content item is encrypted and digital rights management (DRM) functions provided by the media player tool of the user's UND prevents the content from being decrypted without a valid and enabled license. The user may enable the license by opening the content item using the user's media player tool or by establishing a connection to the main website through the user's browser, similar to obtaining a license. The UND creates a connection to the website on the main server and the main server authenticates the license. Once the license is authenticated, the media player tool may decrypt and allow the user to access the content item.

A multiple-layer network architecture as described herein, allows content items to be stored at edge server locations distributed throughout a service region, to improve the efficiency and speed by which content items may be delivered to users in the service region. However, content management and user interaction functions, including business functions associated with receiving payment and controlling access to content items, may be provided by the main server system. By separating content delivery functions (provided by the edge servers) from the content management, user interaction and business functions (provided by the main server system), various benefits may be achieved with respect to security, efficient operation and control. Moreover, by storing content items in the edge servers in encrypted form, further security benefits may be achieved, even if the edge servers are disposed in non-secure locations or controlled by third-party service operators.

BRIEF DESCRIPTION OF THE DRAWINGS

Embodiments of the present invention are illustrated by way of example, and not by way of limitation, in the figures of the accompanying drawings and in which.

PREFERRED EMBODIMENTS

Figure 1:
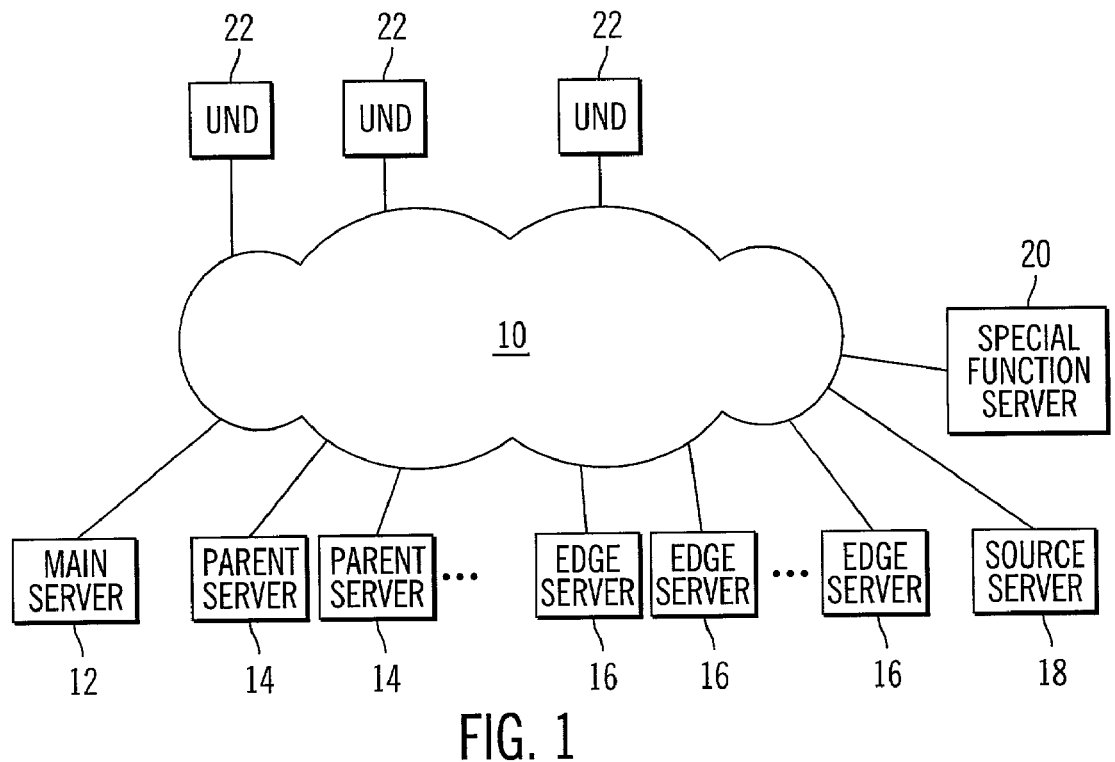
FIG. 1 is a generalized block diagram of a network environment employed by embodiments of the present invention.

As described above, embodiments of the invention relate to systems and processes for delivery of electronic content to recipient processors over a network. The term "electronic content" (or "content") is used herein to refer to all forms of electronic information (information that may be communicated and processed in an electronic form), including, but not limited to electronic files, streamed data, or other data formats for movies, video, music or other audio, still images, game programs, application software, electronic books, episodic television content or other the like Embodiments of the invention may be configured to facilitate the delivery of a relatively large number of content files, data streams or other data arrangements (and/or one or more relatively large content file, data stream or other data arrangement) over a network to a plurality of recipient devices (or users). In yet further embodiments, a system and process is configured for providing a content delivery service, for delivering such content to many users located over a relatively wide region. For example, the system and process may be used as a mechanism for a content owner or holder to distribute content to users on a network, such as the Internet. However, many aspects of the invention may be used in other contexts, including, but not limited to industrial, military, scientific, educational or other contexts in which the delivery of a large number of files and/or a number of large files to a plurality of recipient devices on a network is desired.

Systems and processes according to example embodiments of the present invention may be employed to provide a content delivery service, such as, but not limited to, content renting, selling or lending service, wherein access to electronic content as described above may be provided to users who have purchased or otherwise obtained a valid license on a network. Other embodiments may be employed in other applications in which access to content is controlled over a network.

One example embodiment comprises a movie rental system and process for delivering (downloading) movie files to customers across the Internet. In that example, the content may comprise at least one electronic, digital copy of a movie. Other embodiments of the invention may involve delivery of other types of content including, but not limited to, music files, still image files, game programs, television content, or other software or data.

For purposes of simplifying the present disclosure, embodiments are described herein, primarily with reference to a movie rental service. However, it will be readily understood that aspects of the invention may be employed in other suitable content delivery applications as noted above.

Similarly, the description focuses on implementations for a network video server computer system accessible through the World Wide Web and the Internet. However, some aspects of the invention may be readily adapted to other communication networks, channels and links as well, including, but not limited to, other Internet connection interfaces (an FTP server, wireless Internet interface), other wide area networks, local area networks (LANs), private networks (a network provided by an Internet Service Provider ISP for its subscribers), peer-to-peer connections and direct connections (such as a directly wired set of stations in a limited area such as a hotel, office building, educational facility or the like). For purposes of simplifying the present disclosure, embodiments are described herein, primarily with reference to Internet embodiments. However, it will be readily understood that aspects of the invention may be employed in other suitable network environments.

Network Environment

A generalized representation of a network environment for example embodiments of the present invention is shown in FIG. 1. A system and process according to embodiments of the present invention employs a network of server and recipient processors. In the illustrated embodiment, the components of the network are interconnected for communication across a wide area network 10, such as the Internet.

The servers include at least one main server 12, a plurality of parent servers 14, and a plurality of edge servers 16. Additional servers, such as one or more source servers 18 and one or more special function server 20 may be included in the system. In FIG. 1, the system includes only one main server 12. In other embodiments, more than one main server 12 may be employed, for example, for load distribution or for redundance in the event that one main server fails. Such "servers" may comprise any suitable server computer systems or other electronic processor or logic based systems programmed or configured to operate as described herein.

The recipient processors (also referred to as user devices or user network devices (UNDs)) 22 may comprise any suitable network enabled processor, for example, but not limited to, personal computers (PCs), set-top boxes (STB), digital video recorders (DVRs), other AVHDD devices (such as those systems provided by Tivo or Replay), game consoles (such as PlayStation2), personal digital assistants (PDAs), mobile telephones, network-enabled televisions or other computer or processor system capable of receiving content over the network. Such UNDs may include a media player tool, such as, but not limited to Windows Media Player, Real Player, Quickme or other tool for playing or otherwise accessing the downloaded content item (for example, movie). In addition, such UNDs may include a Digital Rights Management (DRM) system as part of or in conjunction with a media player tool (or other accessing tool), as described below. Functions of the DRM and further functions and operations of the UNDs and servers described herein may be implemented in any suitable manner, including, but not limited to, software running on the associated server or UND, dedicated logic circuitry or other suitable electronics included with or connected to the associated server or UND.

According to example embodiments of the invention, the main server 12 interacts with the UNDs 22, to provide a user interface for allowing users to select content items for downloading. In some embodiments, the interface comprises a main website accessable over the network 12 (for example, the Internet), to users on UNDs 22. The main server 12 supports the operation of the interface (for example, website), including receiving information, such as requests or selections of content items, from UNDs 22.

The main server 12 may also store content items, such as movies, in encrypted electronic files. The content items (such as, movies) may be supplied to the main server 12 by content owners or holders (such as movie studios or other suitable sources), for example, from a source server 18. Alternatively, or in addition, the main server 12 may be supplied with content items in other suitable manners.

Copies of the content items (for example, movies) are stored again on the parent servers 14. Additional copies are stored on edge servers 16 throughout a distribution region, such as throughout the United States. A user of a UND interacts with the main server for browsing and conducting commercial transactions. However, the main server redirects the UNDs (transparently to the users, in some embodiments) to edge servers 16 for downloading content items.

In website embodiments, the UNDs 22 may operate with browser or other suitable software to access the website and display website content to the user in a conventional manner of Internet communications. When a UND 22 is connected in communication with the main server 12, the website may be displayed on the user's UND as a user interface, for allowing a user to receive user-perceptable information from the main server 12 and communicate information, such as requests for content or requests to link to additional pages or other sites, to the main server 12.

In example embodiments, the user may browse through website text and images describing content items, such as movies, available for downloading. The website may provide the user with search and other functions to assist the user in locating and selecting content items. When the user has found a content item (for example, a movie) that the user would like to access, the user pays a license fee, for example, by submitting payment information, such as credit card, bank card, bank account, pre-paid account or other suitable form of payment information or recordable renumeration. Alternatively, upon the user selecting a content item, a license fee payment may be deducted automatically from such cards, accounts or other payment sources, transparent to the user. The license fee purchases a limited license to access the selected content item (for example, view a selected movie).

Once payment has been received, the user may obtain a license and receive a uniform resource locator (URL) from the main website, where the URL provides the user's UND with an address or the like, to direct the user to an edge server 16 from which the user may download the selected movie. In further embodiments, a license may be purchased either at the time of selecting the movie and receiving the token or at a later time, when the user desires to view the movie.

Once the UND has downloaded the selected content item (for example, movie), the UND may operate a media player tool, such as, but not limited to Windows Media Player or Real Player, or other tool for playing or otherwise accessing the downloaded content item (for example, movie). The user may open the downloaded content file (for example, movie file) using the media player tool. When the user opens the content file, the media player tool connects to the website to verify and enable the license. Once the license has been enabled, the user may freely access the content item (for example, view the movie) through the media player tool, based on the policy of the license. In one example embodiment, the license policy may allow the user to access a content item (for example, view a movie) as many times as the user desires during a predefined window of time, such as a 24-hour period, starting from when the license is enabled. After the license expires, the user or another person may access the content item (for example, movie) again by purchasing and downloading a new license, without downloading the content item (for example, movie) again.

A system according to an embodiment of the invention can be broadly divided into three main areas: (1) the interface (or main website) where users interact with the system, (2) the network architecture and operation, including content distribution operation and content delivery operation, and (3) the security functionality restricting how users can access or view the downloaded content.

The Interface (or Website)

As described above, example embodiments of the present invention include a user interface, for allowing users on UNDs to interact with the system, through the main server 12. In the above examples, the interface comprises a main website supported by the main server 12. In other embodiments, the interface may comprise any suitable interactive tool that allows communication of content item selections and other information, depending upon the embodiment. For purposes of simplifying the present disclosure, embodiments are described herein, primarily with reference to a website interface. However, it will be readily understood that further embodiments of the invention may employ other suitable interfaces.

From a user's perspective, the service, according to one example embodiment of the invention, begins when the user connects to the main website across the Internet, using a personal computer (or other suitable processor as described above) and standard web-browsing software. The user may connect to the website by, for example, connecting to the address or uniform resource locator (URL) associated with the main website.

The main website may have a home page and a tree of numerous additional web pages interlinked with the home page at the root. The pages of the main website may present various information to the user, such as descriptions of content items (for example, movies), still images, clips (segments of a content item, such as a movie, taken as one contiguous segment, as it would be seen when the content is played in its normal manner, and streemed to the user's processor), and trailers (packages of clips and special audio typically used to promote a content item, such as movie trailers commonly shown as previews of coming movies, streamed to the user's processor). The user may browse through the website by following links within the pages of the website or by using various tools, including, but not limited to a search tool, a carousel rack presentation of movies, menus, lists and the like.

While the actual sequence of events and operation of the pages of the main website may vary with different embodiments, in one example embodiment a user first connects to the website using a web-browser. The user then logs into the website with a user identifier and password or logs in as a guest. A new user can also register with the website to establish a user identifier and password. During the login process and registration, the main website derives information about the user's processor or computer system to provide proper support for the user's interaction (for example, to determine the type of streaming files to use). The user identifier associates the user with a customer account on the website. In another embodiment, the main website has group accounts (such as a family, company, school or other organization group) where members of the group have separate identities but are tracked as a group. This grouping allows auditing of member activity by other members (for example, but not limited to, parents checking on children). Also, different members may have different access privileges (for example, but not limited to, access rights to different types of movies or amounts of money that can be charged).

Once logged in, the user is directed to a home page. The home page presents options the user may take (for example, but not limited to, selecting content items, browse, search, rent, mark). The home page may also include information, such as images promoting certain content items currently selected by the service operator for promotion.

When the user has found a content item (for example, a movie) that the user would like to access, the user selects a rental option and enters a commercial transaction page. The user may be taken to a transaction page or display to allow the user to provide purchasing information (for example, but not limited to, credit card information or a prepaid account identification) to purchase a license for the selected content item (for example, movie). Credit card information also may be used for age and geographical location verification. For example, if the user has access to a credit card, it may be assumed that the user either is over 18 years old or has the permission of a guardian (the credit card holder) that is over 18 years old.

When the license purchase has been successfully completed, the main website may query whether the user wants to download the purchased license immediately to the machine being currently used by the user, or to download the license later to a different machine. In one embodiment, the purchased license will be valid only on the machine to which the license is initially downloaded. As described in more detail below, security features may operate to associate the license with the selected content item (for example, movie), the machine initially receiving the license, and the media player tool on that machine. This creates a relationship between the license, the selected content item (for example, movie) and the particular machine receiving the license, so that the content item (for example, movie) can only be accessed or viewed (without purchasing another license) on that particular machine, with the media player tool on that particular machine.

When a user purchases a license for a selected content item (for example, movie), the main website also provides the user's UND with a URL (uniform resource locator) that will allow the user to download the encrypted electronic file containing the content item (for example, movie) from an edge server associated with the URL. The user may input the URL to the user's web browser immediately or wait and download the content item (for example, movie) at a later time. Alternatively, this URL can be provided transparently to the user's web browser to cause the download to begin immediately.

When the user attempts to download the content item (for example, movie), the system authenticates that this user is currently permitted to download the content item before providing the content item to the user. The actual file that the user will access for download need not be stored on the physical server system associated with the main website, but rather on an edge server 16 elsewhere within the network. When the download has been approved, the system will resolve the URL of an appropriate edge server 16 for downloading the encrypted electronic file containing the requested content item (for example, movie) to the user's UND.

System Network Architecture

As described above, system network architecture, according to embodiments of the invention, includes a plurality of interconnected computer or processor systems that physically store and transfer data to enable the content delivery service to operate. The structure and operation of the system network preferably provides a robust and efficient delivery of content to the end-user, while the end-user remains superficially unaware of the network structure and operation, perceiving most activity as though the activity occurred at a single remote location hosting the main website.

Figure 2:
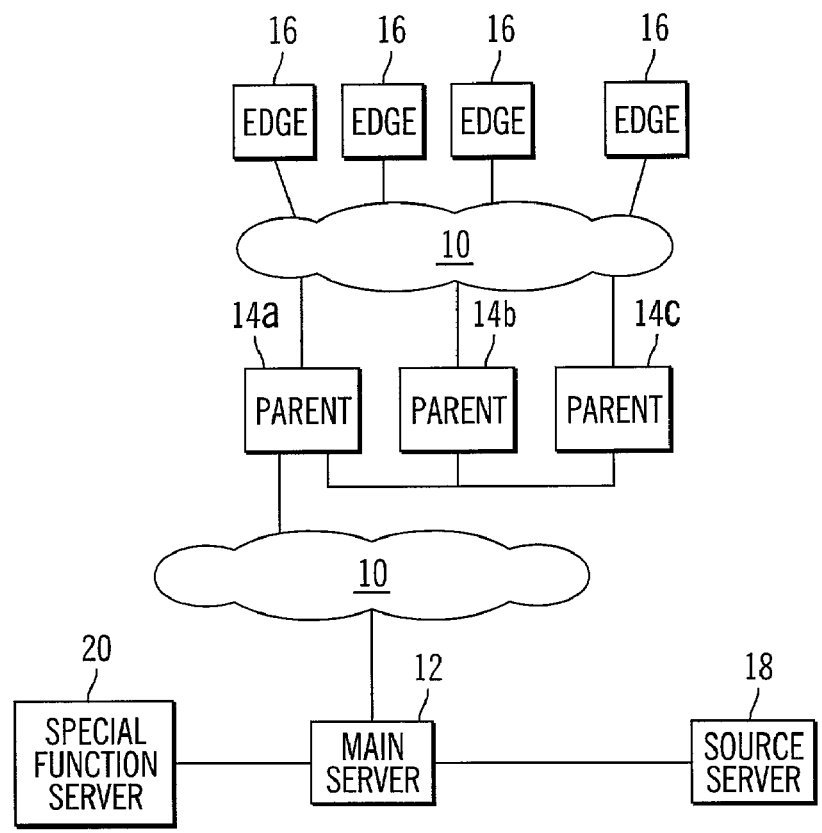
FIG. 2 is a generalized block diagram of a network architecture according to an example embodiment of the present invention.

Embodiments of the invention may employ a multiple layer architecture of servers, where the architecture is configured to provide an efficient content delivery service. An example embodiment of a multiple-layer architecture is shown in FIG. 2, wherein the system network includes three layers of servers connected by a network 10, such as the Internet. In the FIG. 2 example, the same network 10 is shown in two locations to better illustrate the layered configuration and operation of the system. In other embodiments, different networks may connect different layers.

In the FIG. 2 embodiment, the three server system layers include at least one main server system 12, a plurality of parent server systems 14, and a plurality of edge server systems 16, such as described above with respect to FIG. 1. The example embodiment in FIG. 2 includes one main server system 12, three parent server systems 14 (identified as 14a, 14b and 14c), and a plurality of edge server systems 16. Other embodiments may employ other suitable numbers of main server systems, parent server systems and edge server systems.

The layers interact with one another to provide a caching system for the content items (for example, movies) available through the service. The network may also include additional components to support interaction between the layers, such as load balancing devices (not shown) for balancing loads between the user and the edge server and between the edge servers and the parent servers. Any suitable load balancing devices may be employed, including, but not limited to Global Director provided by Cisco.

As described above, the main server system 12 supports the main website. The main server system 12 implements business logic for providing functions associated with user interaction, such as browsing, selecting content items, and purchasing or otherwise obtaining licenses for content items (for example, for rental of movies). The main server system 12 also implements the administration tools of the website, tools for authenticating download requests and security functions for enabling licenses to access content items (for example, view movies). The main server system 12 may authenticate download requests to ensure that the requesting user has purchased or otherwise obtained a valid license, is in a geographical region where the content item (for example, movie) can be downloaded (according to licensing agreements or other geographic restrictions that may be associated with the service or selected content), and/or is not repeatedly downloading the content item (for example, in a denial of service attack).

The main server system 12 also may store all of the content accessible through the main website, such as content for streaming clips, trailers and other information. In addition, the main server system 12 may store all of the content items (for example, movies) available for licensing through the service. However, as described below, downloads to user's are handled by the edge servers 16 and distribution to the edge servers is handled by the parent servers 14. In this manner, the network system implements a division of functions of business logic and storage between the main server and the parent and edge servers.

To facilitate authenticating download requests, the system network may also include one or more special function servers 20, for example, a third party service systems that performs geofiltering (determining a geographic location associated with the UND, to restrict access based on geographical location of the user). Such geofiltering systems may include, for example, but not limited to TraceWare™ by Digital Island. TraceWare™ is a service which maintains a database of Internet Protocol (IP) addresses and physical regions associated with such addresses. Further embodiments of the invention may employ other suitable databases or systems for determining or estimating the geographic location of the user. The main server system 12 may connect to one or more special function servers 20 through the network 10 or through any other suitable means, including, but not limited to, direct connection or connection through a LAN or other network.

The main server system 12 may connect to one or more source servers 18 for receiving content items (for example, movies) and/or instructions relating to distribution of content items from the source server(s). The main server system 12 and source server(s) 18 may be connected through the network 10 or through any other suitable means, including, but not limited to, direct connection or connection through a LAN or other network.

A content owner or holder, such as a production studio, may operate a source server 18 to provide the main server system 12 with content items and, in further embodiments, instructions for controlling the distribution of the content items. Alternatively, or in addition, the main server system 12 may be supplied with content items in other suitable manners, including, but not limited to, delivery on an electronic memory device or recording media, dedicated communication line or live input.

Figure 3:
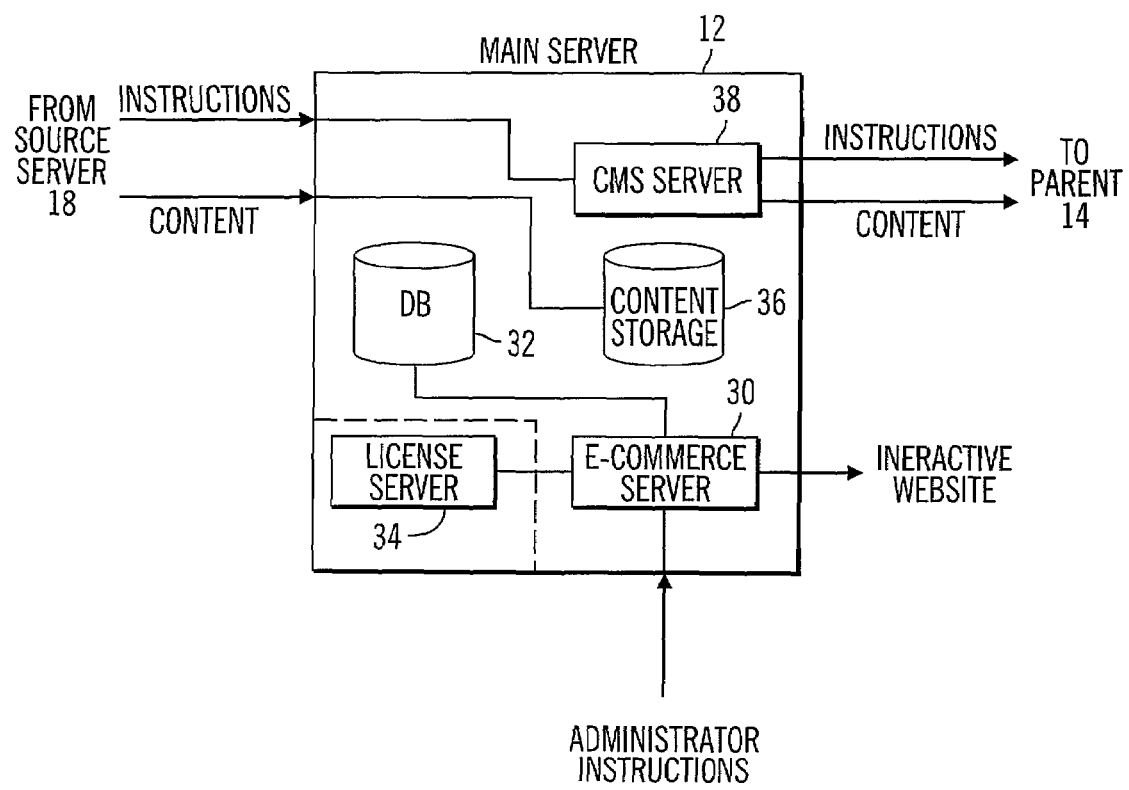
FIG. 3 is a generalized block diagram of a main server system according to an example embodiment of the present invention.

A generalized representation of a main server system 12 according to an example embodiment is shown in FIG. 3. In the FIG. 3 example, the main server 12 includes or operates with an e-commerce server subsystem 30 for providing interface (for example, website) displays, interactive functions and various transaction and business functions associated with a user's interaction with the interface (for example, website). The main server system 12 may include or operate with a storage facility, such as a database 32, for storing interface (for example, website) display content, user demographic information, and other information relating to the interface (or website). The e-commercer server subsystem 30 may be connected to retrieve information from the database 32, as needed.

The main server system 12 may include a license server subsystem 34, connected to the e-commerce server subsystem 30, for issuing, storing and validating licenses, as described below. The license server subsystem 34 may be located in a protected area in which security precautions are implemented to inhibit unauthorized access, as represented by the broken line in FIG. 3. In addition, some or all of the database 32 may be included in a protected area.

In embodiments as described above in which the main server system 12 stores content items that are made available through the service, the main server system 12 may include or operate with a content storage device or facility 36. In one embodiment, the content storage facility 36 stores all of the content items made available through the service. The content storage facility 36 may be any suitable device or system capable of storing digitally encoded content items, including, but not limited to electronic, electromagnetic, optical, or electro-optical storage devices.

Content items may be provided to content storage facility 36 from a source server 18 or any other suitable source, as described above. In other embodiments, the main server may pass content items to the parent servers 14, without storing copies in a facility 36. In yet other embodiments, the main server passes some content items to parent servers, without storing such items at the facility 36, while other content items passed to the parent servers are stored at the facility 36.

The main server system 12 also includes a content management system (CMS) server 38, for controlling the distribution of content and instructions to parent servers 14. The control of content items and instructions distributed from the main server 12 to parent servers 14 may be based on instructions received from external sources, such as a source server 18.

In the embodiment shown in FIG. 2, the parent servers 14 provide three centralized locations for data storage. As described in more detail below, the parent servers 14 may be operated as cache servers, for cache storage and distribution of content items to the edge servers 16. Three parent cache servers 14 located at selected locations across the region may be preferred for providing a content distribution service over the Internet within a region of about the size and population of the United States, wherein one parent cache server may be located near the west coast, another parent cache server may be located near the east coast and a further parent cache server may be located in the central portion of the country. However, in other embodiments, other suitable numbers of parent cache servers 14 may be employed and distributed in any suitable manner with respect to the systems's service region.

In one example embodiment, one of the parent cache servers 14a is designated as the primary parent and is the only parent server that directly receives content items (for example, movie files) from the main server 12. However, each of the parent cache servers 14a, 14b and 14c may connect to the main server 12 through the network 10 or other suitable connection as described above, so that the particular parent cache server designated as the primary parent may be changed. The designation of a particular parent server as the primary parent server may be made by instructions from the main server 12.

The primary parent server 14a is connected to the other parent servers 14b and 14c by separate direct connections, daisy chain connection, through the network 10 or through any other suitable means, including, but not limited to, direct connection or connection through a LAN or other network. The primary parent server 14a distributes content items (for example, movie files) received from the main server 12 to the other parent servers 14b and 14c. In this way, each of the parent cache servers 14 may store a complete set of copies of all of the movies available through the service. In addition, because the secondary parent cache servers 14b and 14c are supplied content items from the primary parent cache server 14a, the system may provide a greater assurance that all of the parent cache servers store the same content items at any given time, which can be desirable in contexts in which content items are updated regularly. However, in alternative embodiments, the main server 12 may communicate content items and instructions directly to each of the parent servers 14.

The edge servers 16 provide distributed storage which, preferably, is comparatively local to users. The edge servers 16 may be physically spread throughout the service region. About twenty to twenty-five (for example, twenty-three) edge servers 16, each having about 125 Giga Bytes of available storage, located at selected locations across the region may provide sufficient content distribution services over the Internet within a region of about the size and population of the United States. However, in other embodiments, other suitable numbers of edge servers 16 may be employed and distributed in any suitable manner with respect to the systems's service region. Edge servers 16 may be strategically located near areas in which a high volume of usage is expected, such as on or near a college campus or associated with a college server.

The edge servers 16 store copies of some of the content items (such as movies) available through the service. The edge servers 16, the parent servers 14 and/or the main server 12 determine which content items (such as movies) to store, for example, using a combination of instructions originating from the main server 12 and/or a least recently used ("LRU") algorithm. In one embodiment, the edge servers also prompt authentication of a download request by the main server.

Examples of network architecture described herein provide a distributed storage system for caching the encrypted electronic files containing content items, such as movies. In some embodiments, the system is configured to facilitate relatively large files (for example, over about 500 MB), compared to a typical image file or web page accessed over the Internet. Also in further embodiments, the system is configured for supporting a large number of such large files.

Downloading every content item directly from the main server 12 may require a very large and complex server (especially where the content items are relatively large and/or the number of content items is large). Accordingly, in preferred embodiments, the function of downloading content items (for example, movies) to users is distributed among multiple servers. Conventional caching approaches based on file accesses are not designed for a mix of very large and very small files and could remove inappropriate files from the cache, from the business view of the service operator.

Content Distribution Operation

In operation, content items are first distributed to edge servers to be available for downloading to service customers. Once sufficient distribution has occurred, users may access the system through the interface (for example website) provided by the main server system 12, to select, submit a request and purchase (or otherwise obtain) a license for one or more content items available through the service.

Content items may be distributed to edge servers in any suitable manner, including, but not limited to delivering to the edge servers a physical storage devices or recording media on which content items are stored, communicating content items to the edge servers over direct connections, broadcast channels, networked, other communication connections or combinations thereof. In one example embodiment, content items are propogated through the network architecture, from the main server system 12 to the edge servers, in accordance with instructions from the main server system 12. In the embodiment shown in FIG. 3, instructions and content items from the CMS server subsystem 38 are communicated to the parent servers 14.

Also as described above with respect to FIG. 3, the main server system 12 may include or operate with a content storage facility 36. The content storage facility 36 preferably contains a plurality of pre-stored content items (for example, digitally encoded movie files). In one example embodiment, the storage facility 36 associated with the main server system 12 contains a copy of each content item (for example, movie) available for licensing through the service. The storage facility 36 may also contain content associated with advertisements, promotions, instructions or other information that may be communicated through the network to other servers and user UNDs.

The main server system 12 may obtain content items from other sources, such as source server 18, to store in facility 36 or to pass to the network without storing. In embodiments in which a level of security or control of access to content items is desired (for example, in commercial embodiments in which it is desired to inhibit access to the content item, unless a license is purchased and/or validated), the content items may be received and/or stored in an encrypted form.

The main server 12 provides copies of content items to the parent servers 14. In one embodiment, the main server communicates such content items to a designated primary parent server 14a, which passes appropriate content items on to the other (or secondary) parent servers 14b and 14c, as described above. Each parent server 14 includes or operates with a storage facility (not shown) for storing a plurality of content items received form the main server (or from other suitable sources), such as described above with respect to storage facility 36. In one embodiment, all content items available for license through the service are communicated to and stored on each parent server 14.

The parent servers 14 provide copies of content items to edge servers 16. The edge servers 16 may be divided into groups, with each parent server 14 pre-assigned to provide content items to a respective group of edge servers. Alternatively, the edge servers 16 with which a given parent server 14 communicates to provide content items may be determined by other suitable means, including, but not limited to, load distribution systems that determine servers based on proximity and/or current traffic levels, such as Best Distributor Selection BDI produced by Digital Island. Alternatively, or in addition, the edge servers 16 with which a given parent server 14 communicates may be assigned by instructions provided by the main server system 12.

The edge servers 16 include or operate with storage facilities (not shown) for storing a plurality of content items received from parent servers (or from other suitable sources), such as described above with respect to storage facility 36. In one embodiment, each edge server 16 stores less than all of the content items stored by the parent servers (or by its assigned parent server). The determination of which content items to store in each edge server may be based, at least in part, on instructions from the main server system 12. In one example embodiment, the main server 12 publishes instructions that effectively label one or more content items (for example, movies) as "hot," indicating that the hot content item(s) are to remain in storage on each edge server. Content items (for example, movies) that are not hot may be referred to as "cold," though the cold content items need not be specifically labeled cold.

In other embodiments, the main server 12 may issue instructions that classify content items in more than two ("hot" and "cold") levels. Instructions from the main server 12 may classify content items in many different levels or classifications (such as, level 1, level 2, level 3 ... level n), where each level or classification is associated with a different set of edge servers. Thus, for example, an instruction classifying a content item as level 1 may cause that content item to be stored in all of the edge servers, while an instruction classifying another content item as a level 2 may cause that content item to be stored in a defined set (but less than all) of the edge servers. Similarly, an instruction classifying yet another content item as a level 3 may cause that content item to be stored in another defined set (but less than all) of the edge servers, and so on. In another embodiment, instead of the main server 12 issuing a classification instruction for a content item separate from the associated content item, the classification instruction may be included with the content item.

In one example embodiment, a parent server 14 provides a copy of a content item (for example, a movie file) to an edge server 16, when the edge server 16 requests the content item. An edge server 16 may place a request to a parent server when the edge server 16 receives a request for the content item (for example, the movie file) from a user and the edge server determines that the requested content item is not already stored on the edge server. Additionally, or alternatively, the edge server 16 may place a request when the edge server receives instructions from the main server 12 or a parent server 14, instructing the edge server to store a specified content item (for example, a movie file) and the edge server determines that the specified content item is not already stored on the edge server. Thus, the main server 12 may issue instructions, which may be based on marketing or operational considerations, to have some content items (for example, some movies) always available in some or all edge cache servers 16, despite use patterns.

For example, the edge servers 16 may receive instructions containing lists of "hot" content items (for example, "hot" movies) or other classifications relating to content items that should be stored on the respective edge servers. In one example embodiment, the main server 12 publishes an XML document containing a list of all content items (for example, movies) available on the main server 12, with some content items marked as "hot". Additional parameters may also be included, such as geographic restrictions (so that a content item, such as a movie, that is not available for download in a region will never be stored on edge servers in that region). In one embodiment, the main server 12 publishes instructions to the parent servers 14 and the edge servers 16 and the parent servers republish instructions to edge servers.

Based on such instructions, each edge server 16 may determine whether or not its associated storage facility is storing all of the appropriate content items and, if not, the edge server may request appropriate content items from a parent server. In other embodiments, the content items stored on each edge server may be tracked by the parent servers (for example, the primary parent server) or by the main server, such that determinations as to which content items to load onto the edge servers may be made by the parent or main server. Algorithms or other suitable means, such as LRU analysis, may be used in the determination of which content items to store at the various edge servers.

In further example embodiments, cache storage in the edge servers may be controlled by dividing the storage facility associated with each edge server 16 into two zones: one zone for content items available for license (for example movies), and the other zone for other files. Caching by edge servers 16 in the content item zone follows a combination of server instructions (for example, relating to which content items are "hot") and LRU analysis. According to one embodiment, the edge servers 16 do not remove the hot content items (for example, hot movies) from storage in their content item zones, but the edge servers may add and remove cold content items (for example, cold movies) from storage according to demand and an LRU scheme. Data stored in the other zone follows a typical LRU algorithm.

Thus, in accordance with one example embodiment as describe above, content items (such as encrypted files of digitally encoded data) for licensing through a content delivery service are supplied to the main server 12 from a source server 18 or other suitable source. All content items available for license through the service are stored at a memory facility associated with the main server 12. Content items are communicated from the main server 12, through the network 10, to a primary parent cache server 14a. The primary parent cache server 14a communicates the content items to other parent cache servers 14b and 14c. A copy of each content item may be stored in a storage facility associated with each parent cache server.

The parent cache servers 14 communicate some or all of the content items to various edge servers 16, initially based on instructions provided from the main server 12 and may later be based on a combination of such instructions and other information. The instructions from the main server 12 may employ a classification system with multiple levels, such as "hot" and "cold," where content items classified as "hot" are communicated to and stored by all edge servers. Other ("cold") content items are communicated to and stored by an edge server at later times when user requests for such content items are sent through the edge server and/or based on determinations made from other information. Such other information may include information obtained from an LRU algorithm, records of user activity (such as historical data relating to on-line activities of a user or groups of users), user input (such as user-entered preferences), or the like.

Content Delivery Operation

Once the content items are sufficiently distributed to edge servers 16, users may access the system through the interface (for example, a main website as described above) supported by the main server system 12. By connecting to the main website, users may search and select content items and submit a request to download content items, and purchase (or otherwise obtain) a license for content items.

As described above, when the user purchases a license for a content item (for example, a movie), the user receives a URL containing a token. Alternatively, the URL may be provided to the user upon the user selecting a content item (for example, movie). However, the user still must purchase a license (and the license must be enabled) before the user is able to access (for example, decrypt or view) the selected content item (for example, movie).

The user may access content items through a media player or other suitable tool for playing or otherwise accessing digitally encoded content (such as movie files). However, when the user attempts to access the content item, the URL provided to the user will be resolved by a DNS (domain name server) to connect the user to the appropriate edge server 16 in the system network for the download request. More precisely, the DNS resolves the URL to indicate the system network and a load balancing device directs the request to the appropriate edge server 16. Alternatively, the URL may include address information for a specific edge server 16 to which the user's request is to be sent.

Upon receiving a user's request, the edge server 16 sends a query to the main server 12 to authenticate the request before providing the selected content item (for example, movie) to the user. In one embodiment, the edge server 16 sends the query even before checking its associated storage facility for the content item (for example, movie). Accordingly, the edge server itself need not authenticate the request and, thus, need not include the software for performing that function. In this manner, the authentication function may be centralized with the main server 12, for better security and efficient administration. However, other embodiments may employ edge servers 16 with authentication functionality.

The query to the main server 12 may include information identifying the requested content item (for example, movie), the requesting user, and the user's current IP address. To verify that the user has purchased a license, the main server may check its records (for example, stored in database 32) to determine or verify that the requesting user has purchased a license for the requested content item (for example, movie). In one emodiment, as part of the processes of verifying whether the requested content item (for example, movie) may be downloaded to the user's location, the main server 12 passes the user's IP address to the TraceWare™ service, or other suitable geographic locator system. The geographic locator system estimates the user's geographical location, for example, by comparing the supplied IP address with a database. The geographic locator system then compares the resulting location with rules previously supplied by the main server 12 and responds to the main server with data indicating whether the download is to an allowable location.

In another embodiment, the main server 12 receives data simply identifying a geographical region associated with the user's IP address from the geographic locator system. Then software associated with the main server 12 determines whether or not a user's IP address is within a geographic region to which the requested content may be delivered, without violating contractual obligations or other restrictions. In one example embodiment, geographic restrictions are implemented by the system such that only users in the United States are allowed to download content items (for example, movies).

To verify that the content item (for example, movie) has not been excessively downloaded using a particular URL, the main server compares the token in the URL to a corresponding record maintained by the main server 12 that tracks the number of times this URL (or token) has been used to attempt to download the content item. The main server 12 may determine whether or not the number of attempts have exceeded a pre-defined threshold. For example, a URL (or token) can be used three times before becoming invalid, to allow for download failures. Other maximum use limits may be employed in other embodiments. After exceeding the limit, the token is disabled and the URL is no longer valid. A URL with a disabled token will not be authenticated by the main server 12.

Thus, the network may authenticate a request to download a content item (such as a movie), for example, by verifying that: (a) the user has purchased a license for the requested content item, (b) the user is in a geographical region that is allowed to download the requested content item, and (c) the user is not attempting to download the content item more times than is reasonable. If one or more of these checks fail, the main server 12 denies the authentication and instructs the edge server not to proceed with the download of the content item (for example, movie). The user may be displayed a message or otherwise directed to contact a customer representative for assistance in proceeding. If, on the other hand, authentication is successful, the selected content item(s) may be downloaded to the user's UND.

Security and Digital Rights Management

As described above, content items, such as movies, available through the service may be encrypted in accordance with any suitable encryption scheme. The encryption scheme may be changed periodically to inhibit piracy. For example, the encryption scheme may be changed every 30 days.

To access a content item (for example, view a movie), a user accesses the electronic file containing the content item (for example, movie file) through a media player tool or other suitable tool on the UND 22. The media player tool includes digital rights management (DRM) technology to control access to the encrypted content according to the license provided by the main server 12. The license may be considered both a legal concept and a literal object, an electronic data file.

As described above, when a user purchases a license for a content item (for example, rents a movie) at the main website, the user is purchasing a license to access the content (for example, view the movie) under certain restrictions. The license may include a restriction that the user can only access the content item (for example, view the movie) on a single UND. Alternatively or in addition, the license may include a restriction that the user can only access the content item during a predefined window (for example, a 24-hour window).

When the user purchases the license, the user may be provided with a choice between downloading the purchased license immediately to the UND being currently used by the user, or downloading the license later to a different machine. This choice may be presented as selectable options, for example, on an interface (such as a website as described above). If the user selects to immediately downloads the license, the license will be bound to the current UND and media player tool installed on that machine. If the user were later to place a copy of the downloaded content item (for example, movie) and license on a different machine, the license would not be valid and could not be enabled to allow the user to access the content item (for example, view the movie). If the user wants to access the content item (for example, view the movie) on a different machine from the machine that the user is currently using, the user may download the license later directly to that other machine.

In one example embodiment, to download the license at a later time, the user may use either the media player tool or a web-browser to connect to the main website and request the purchased license. Using the media player tool, the user simply attemps to access the content item (for example, open the movie for viewing). In response, the DRM of the media player tool determines whether a license has been provided and, if not, recognizes that the user needs a license. In that event, the media player tool connects the user to the main website to download the license.

If the user has not previously purchased a license for the content item (for example, the user received a copy of the content item other than by downloading the content item from the service network), the main website will query whether the user would like to purchase a license. In this manner, distribution of copies of the encrypted content files among users and potential users may be encouraged by the service operator, because the content cannot be accessed (the movies cannot be viewed) without a valid purchased license.

The downloaded license may be associated with the downloaded content item (for example, a movie) and the media player tool. If the media player tool cannot find the license or the content item (for example, movie), the user may manually direct the media player tool to the local storage location containing the license or content item (for example, movie).

After a user has downloaded a content item (for example, movie) and a purchased license, the user must enable the license before accessing the content item (for example, viewing the movie). The electronic file containing the content item (for example, movie) is encrypted and the DRM provided by the media player tool prevents the content from being decrypted without a valid and enabled license. The DRM of the media player tool recognizes the differences among an enabled license, a license not yet enabled, and the lack of a license. The user may enable the license by opening the content item (for example, movie) using the user's media player tool or by establishing a connection to the main website through the user's browser, similar to obtaining a license. The media player tool creates a connection to the main website and the main website authenticates the license.

To authenticate the license, the main website confirms that: (a) the license has been purchased, (b) the license matches the content item (for example, movie) being accessed, (c) the license matches the machine accessing the content item (for example, movie), and (d) the license matches the media player tool accessing the content item (for example, movie). The license includes identifying information that indicates the content item (for example, movie) associated with the license, the processor or computer system to which the license was downloaded, and the media player tool installed on the device to which the license was downloaded. If the license is valid, the main website enables the license.

Once the license is enabled, the user may access the content item (for example, view the movie) through the media player tool, in accordance with the license policy. In one embodiment, the license policy provides that the user may access the content item (for example, view the movie) an unlimited number of times, in whole or in part, during a specified period, such as, but not limited to, a 24-hour period, starting from when the license is enabled. At the end of the specified period, the license expires and is no longer enabled. In further embodiments, the specified period may be a set number of days, one week, one month, one year or any suitable time period or designated time intervals. In yet further embodiments, the license policy may allow only a single access or a specified number of accesses during the specified period, rather than an unlimited number of accessses. In such embodiments, once the specified number of accesses has occured, the license expires and is no longer enabled.

In a further embodiment, the user may re-activate a disabled license by connecting to the main website and paying a reactivation fee or a new license fee. In yet further embodiments, the user must purchase and obtain a new license to access a content item, once the previously purchased license expires.

The user may copy the encrypted file and store that copy on another computer, but will need a valid license to access the file (for example, view the movie) on that second computer. If the user attempts to access the content (for example, view a movie) for which the user does not have a valid license, the media player tool creates a connection to the main website and the main website queries whether the user would like to purchase a license. In preferred embodiments, the main website server determines whether the user has already purchased a license, but has not yet downloaded the purchased license. If so, then the main website may query whether the user wants to download the purchased license at this time.

Example Main Server Embodiment

While the network representations in FIGS. 1 and 2 are shown with a single main server system 12, further embodiments of the invention may employ multiple main servers systems. For example, multiple mirror sites of the main servers may be spaced over a service region, to share or distribute the main server's workload over the multiple main servers.

Figure 4:
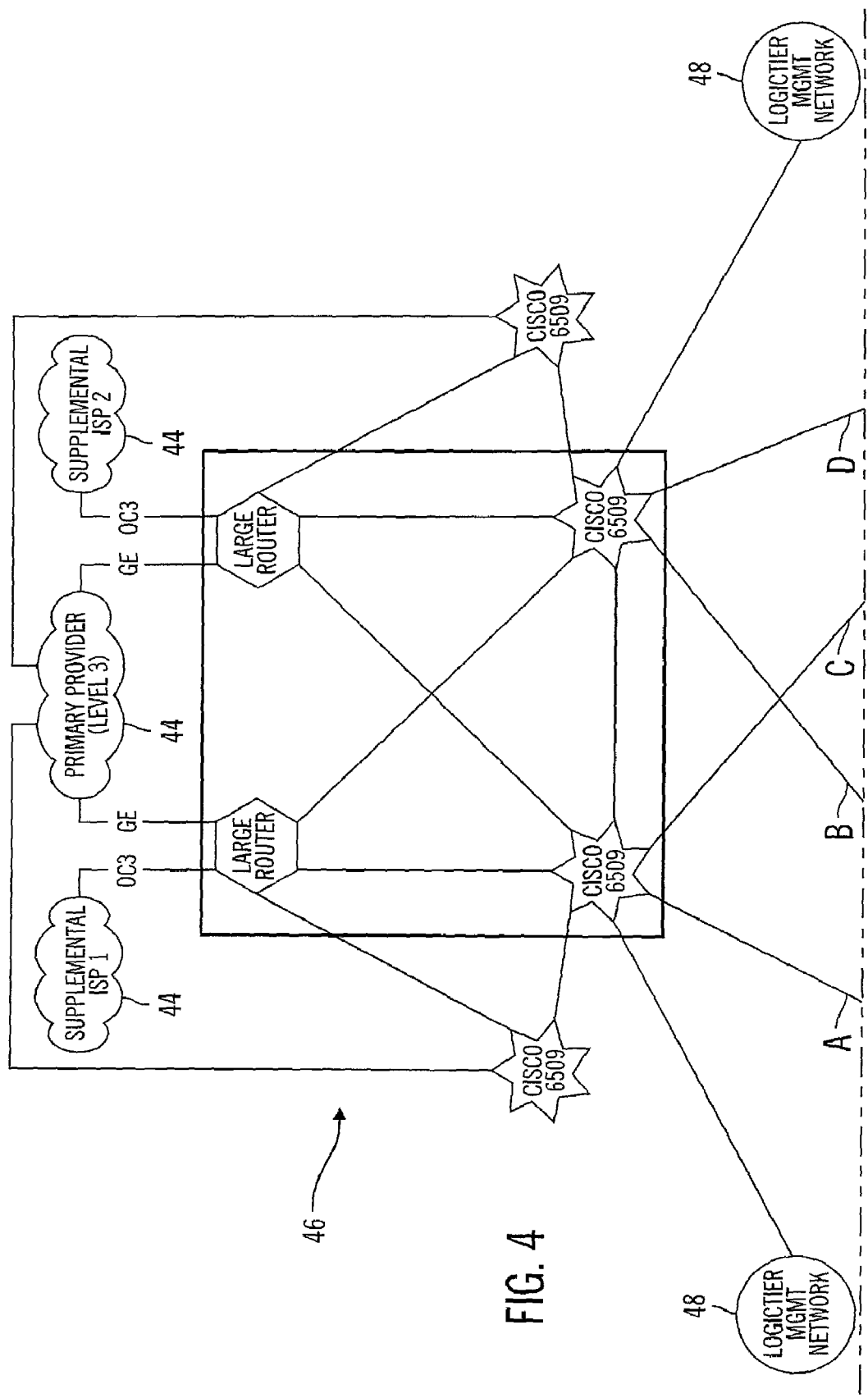
FIGS. 4–10 are schematic diagrams which, together, represent a server system architecture, according to an example embodiment of the present invention.
Figure 5:
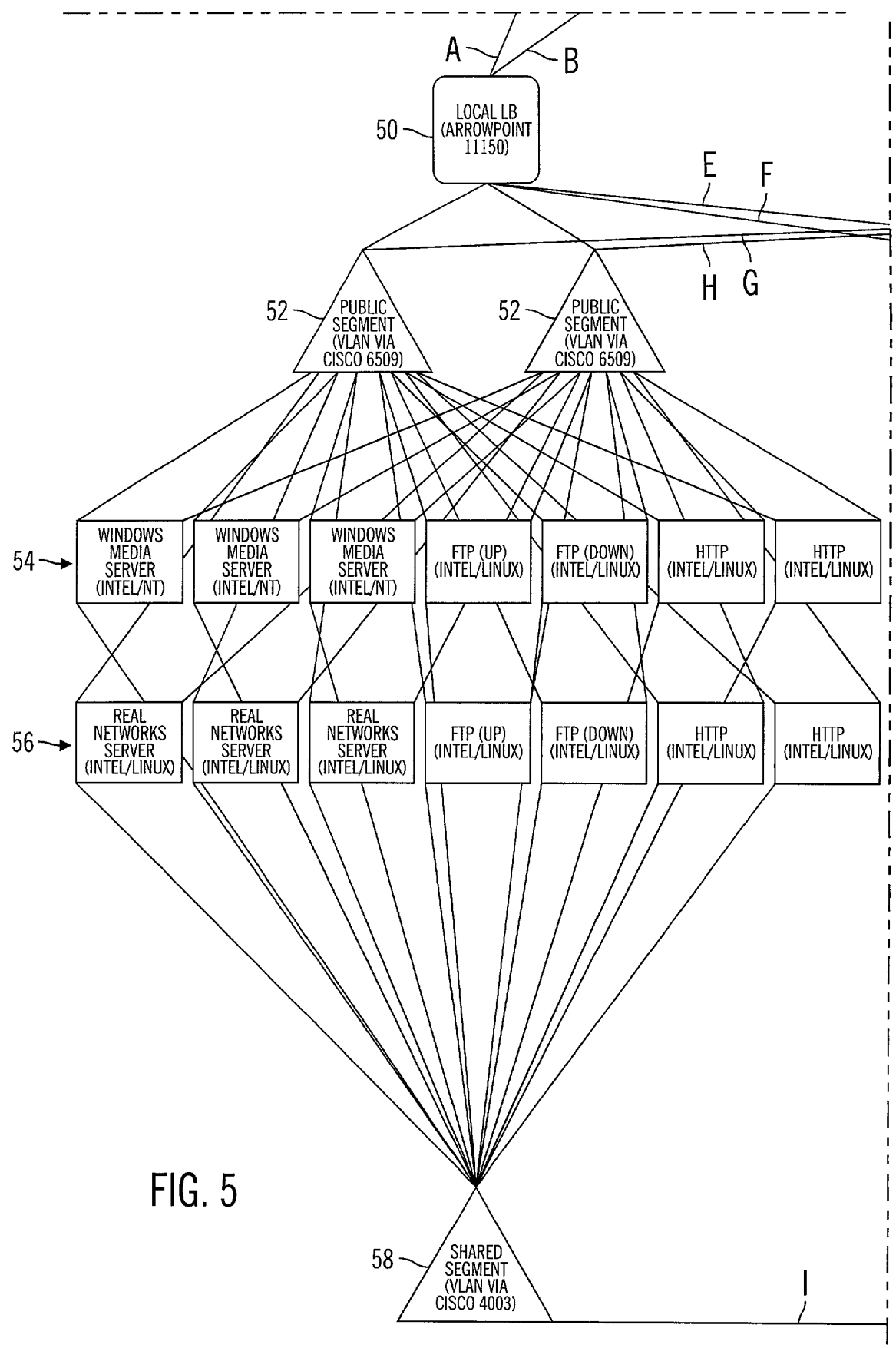
Figure 6:
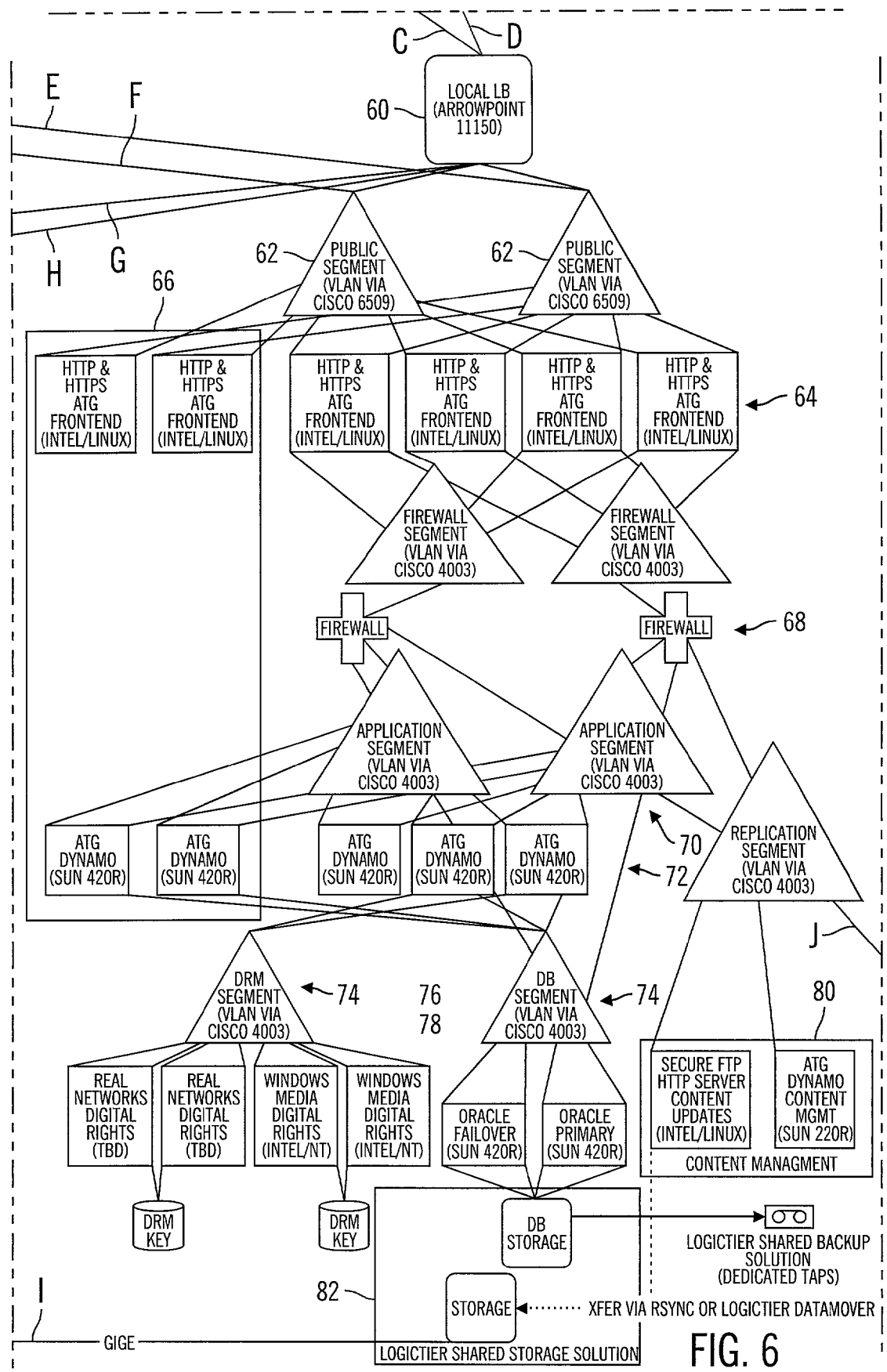
Figure 7:
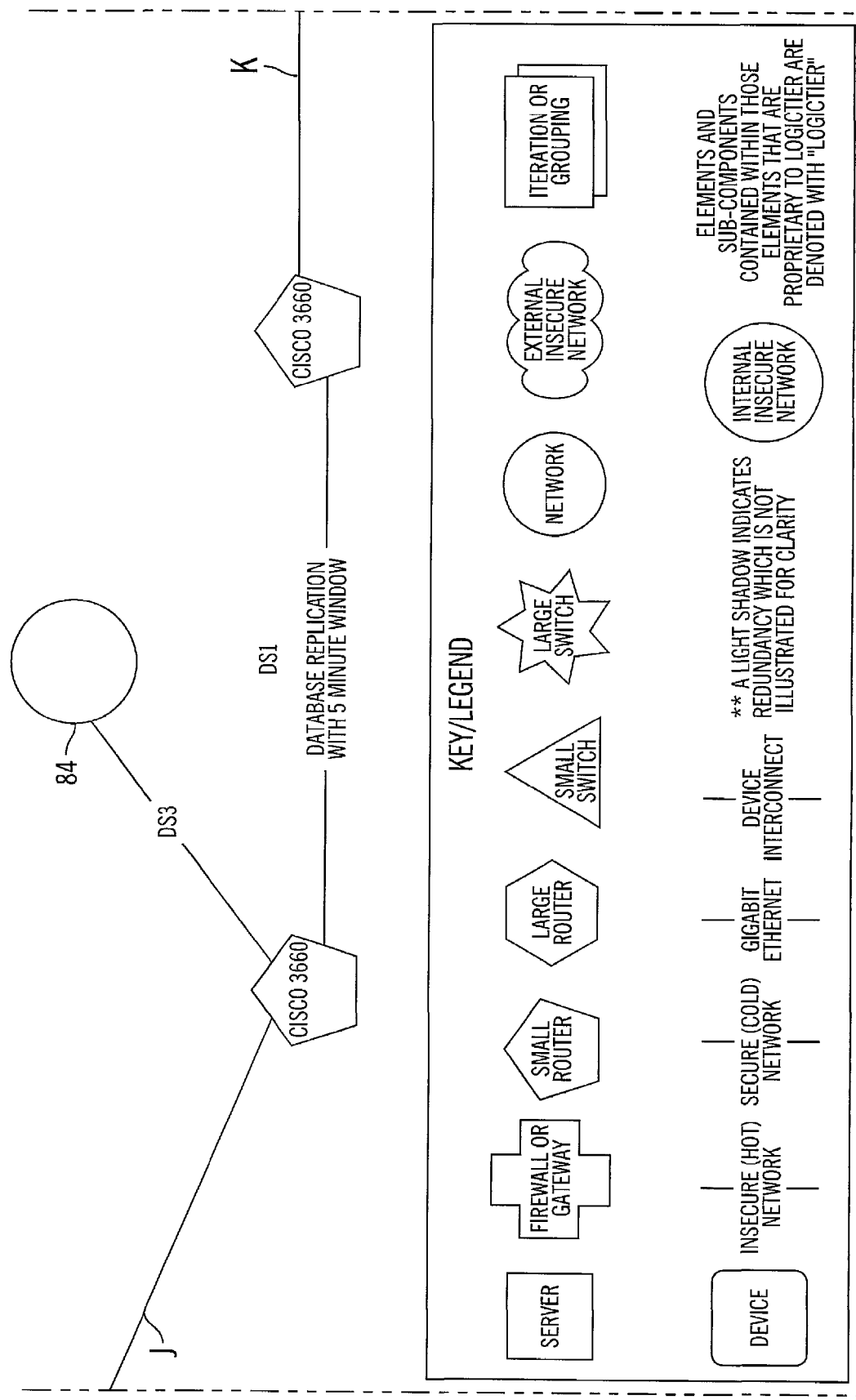
Figure 8:
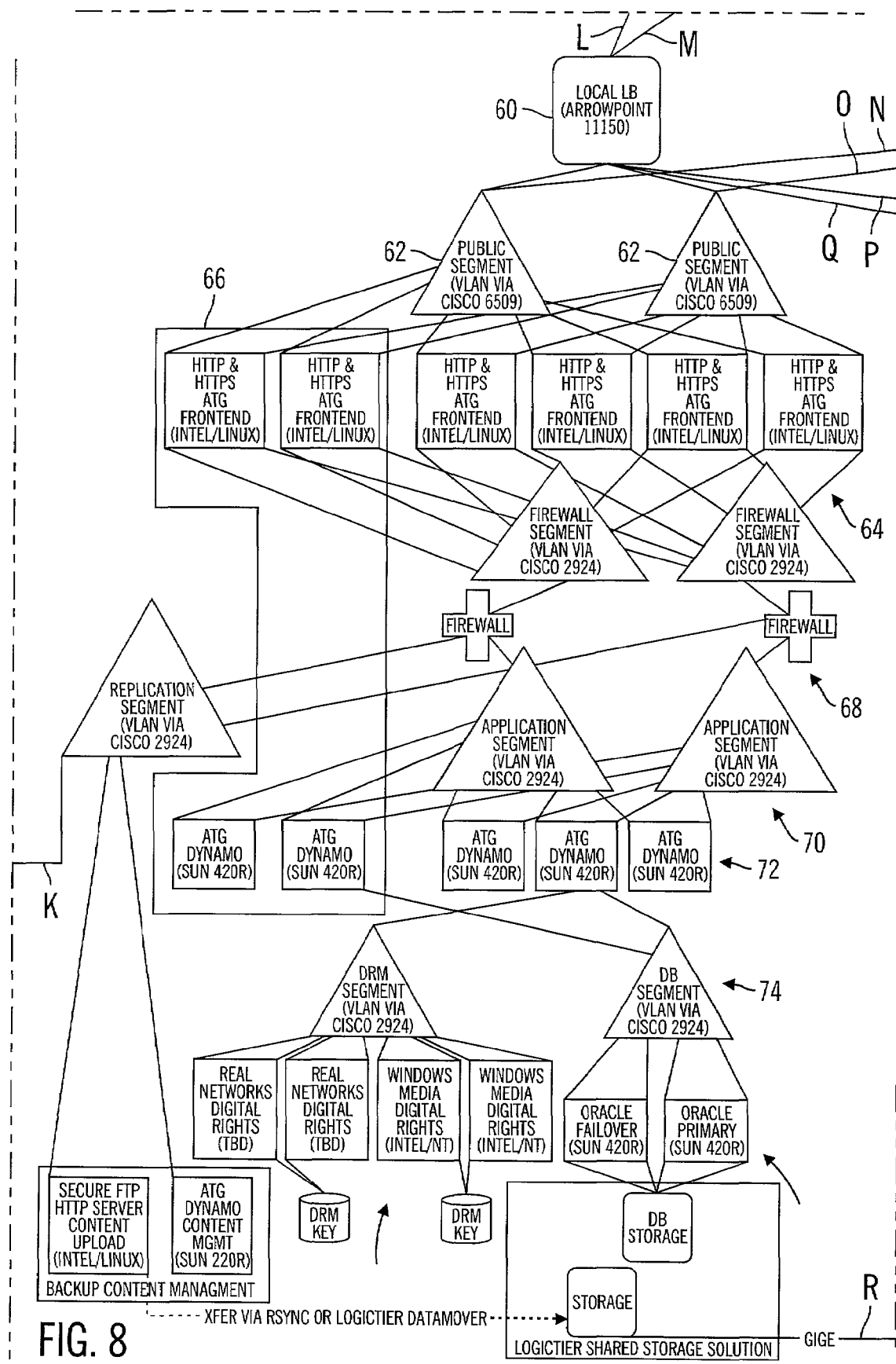
Figure 9:
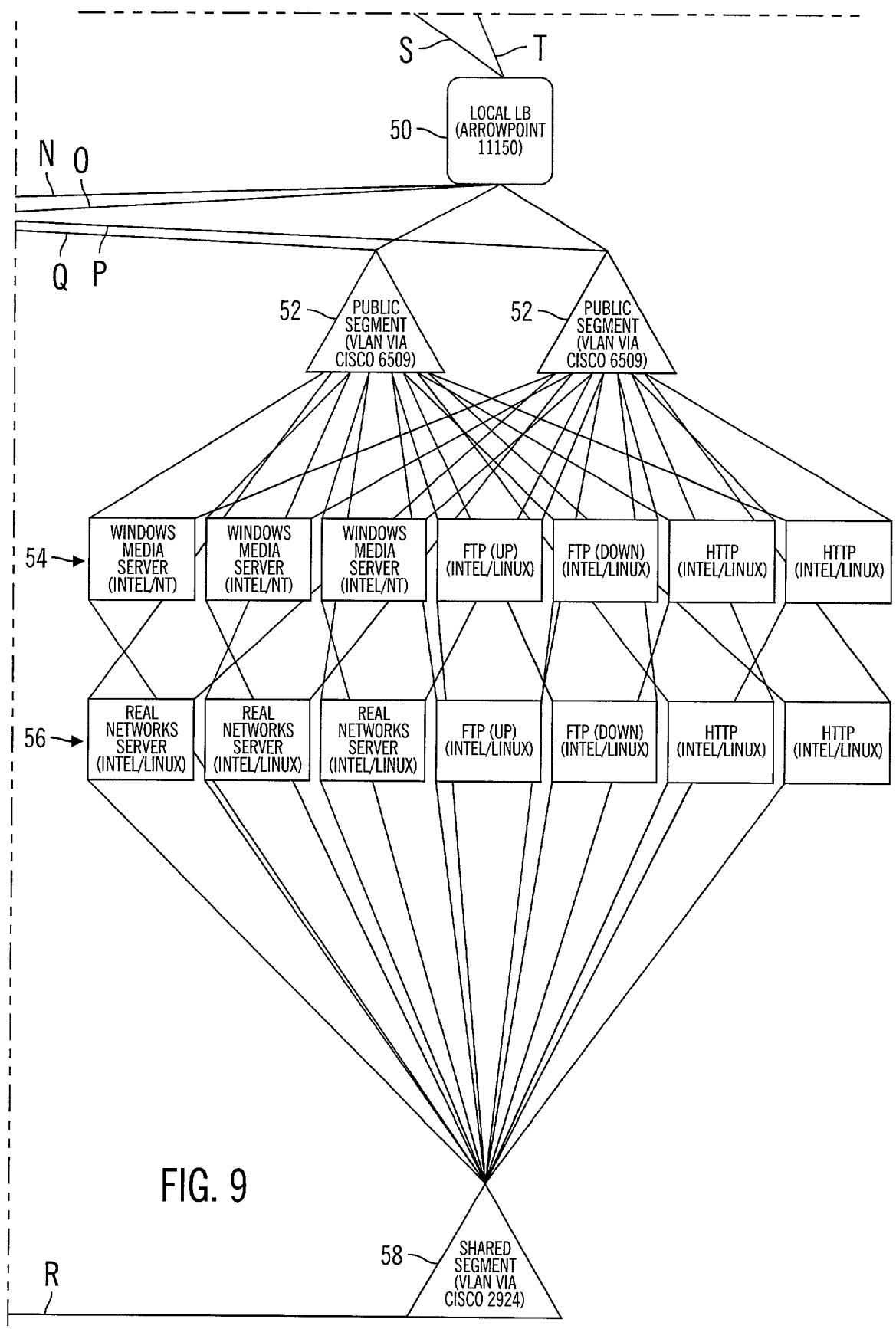
Figure 10:
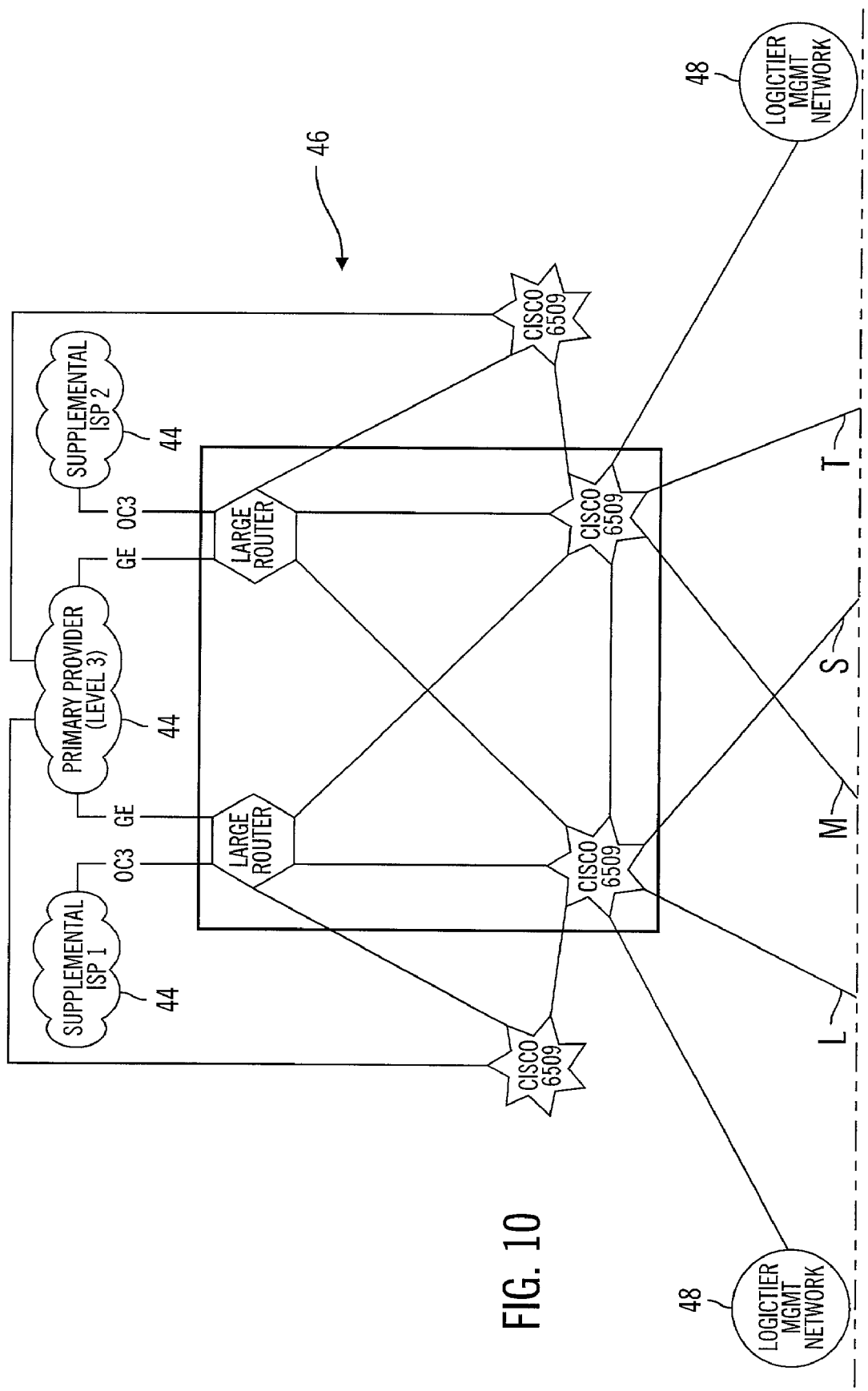

An example embodiment of a main server architecture scheme is shown in the drawings of FIGS. 4–10, wherein interconnected lines on those drawings are identified with corresponding reference numbers. The example main server architecture shown in FIGS. 4–10 includes two main server systems having similar architectures, one of which is represented in FIGS. 4–6 and the other is represented in FIGS. 8–10. An interconnection between the two main server systems is represented in FIG. 7. The two main server systems may be employed simultaneously, for example, to balance user load. Alternatively or in addition, one main server system may be employed as a primary main server, while the other main server system may be employed as a secondary server system to be used in the event that the primary server system becomes inoperative or is unaccessable.

Each main server system is connected to an Internet Service Provider (ISP). Multiple ISP connections may be provided at each main server, for example, to provide redundancy, in the event that one of the ISPs becomes inoperative or inaccessable. With reference to FIGS. 4 and 10, each main server in the illustrated embodiment includes connections 44 to three ISPs. The main server systems may include or operate with suitable routers and load balancing devices. In FIGS. 4 and 10, router and load balancing devices are shown, generally, with reference number 46. Such load balancing devices may receive control instructions from network administrators, as represented by reference number 48. The router and load balancing portion of the system may include multiple devices and multiple paths for redundancy. In the illustrated embodiment, two routers devices are provided, where each router device has two ISP connections and two output paths. Thus, in the event that one device or path becomes inoperable or inaccessable, the other device or path may be employed.

Two of the connection lines from each router portion 46 (lines A and B in FIG. 4 and lines S and T in FIG. 10) lead to a load balancer 50 (in FIG. 5), for directing information to or from the appropriate path. The load balancer 50 of each main server system (in FIG. 5 and FIG. 9) is connected to at least one switch segment 52. The switch segment includes a firewall line between the public side of the network and the non-public side. Multiple switch segments 52 may be used for redundancy and/or load balancing. In the illustrated embodiment, two switch segments 52 are employed in each main server system. The switch segments 52 are each connected to at least one media server for providing website content for displaying on the main web site. In the illustrated example, the media servers include a first set of Windows Media Servers 54 and a second set of Real Networks Servers 56. The media servers 54 and 56 may be connected to a switch segment 58 for distributing information (such as backup content, advertisements or other website information) between the media servers and a shared storage system shown in FIG. 6.

The other two connection lines from each router portion 46 (lines C and D in FIG. 4 and lines L and M in FIG. 8) lead to a further load balancer 60 (in FIG. 6), for directing information to and from the appropriate path. The load balancer 60 of each main server system (in FIG. 6 and FIG. 7) is connected to at least one switch segment 62. The switch segment 62 may include a firewall line between the public side of the network and the non-public side. Multiple switch segments 62 may be used for redundancy and/or load balancing. In the illustrated embodiment, two segments 62 are employed in each main server system. The load balancer 60 may also be connected to the switch segments 52, as represented by lines G and H. Similarly, the load balancer 50 may be connected to the switch segments 62, as represented by lines E and F. In this manner, each load balancer 50 and 60 may direct information to any of the switch segments 52 and switch segments 62, for example, to provide for backup redundancy and/or load balancing with the other director.

Each switch segment 62 is connected to at least one (and preferably multiple) e-commerce server 64. The main server system need not be dedicated to providing a single content licensing or delivery service. For example, some e-commerce servers 64 of the main server system may be designated for use with other service applications, as represented by the box 66. Each of the e-commerce servers 64 employed in the presently described content licensing or delivery service is connected, through a further firewall segment 68 to various switch segments 70 and for ther servers 72. The further servers 72 are connected, through yet further firewall segments 74 to license servers 76 and customer servers 78. The customer servers 78 handle returning customer information and user history information.

Network administrators, with appropropriate access rights, may connect, for example, through firewall segment 68, from a management section 80. Storage of backup content for disaster recovery may be provided by a shared storage system 82. As shown in FIGS. 6 and 7, a content owner or holder (source server) 84, with suitable access rights, may connect through firewall segment 68, for example, to provide or update content, including content items to be licensed through the server and/or website content, or to provide instructions relating to content items.

In the example embodiment of FIGS. 4–10, multiple redundant paths and devices are provided to, for example, improve reliability and/or efficiency of the main server system. In addition, multiple firewall layers and other separations of contentend and business-end processes are implemented for improved security. It will be understood that FIGS. 4–10 show one representative example of a main server architecture. Other embodiments of the invention may employ other suitable main server architectures and schemes.

Further Network Architecture Embodiments

Figure 11:
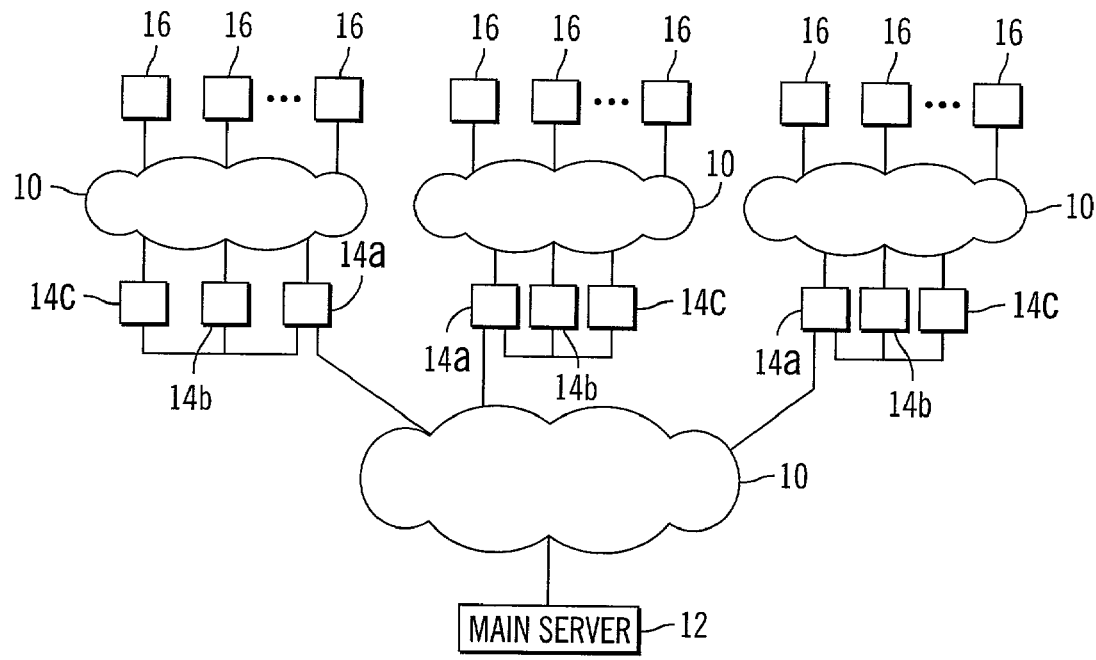
FIG. 11 is a generalized block diagram of a network architecture according to another example embodiment of the present invention.

The network architecture shown and described above with reference to FIG. 2 includes a single group of interconnected parent servers 14 in the parent server layer. In other embodiments, one or more main servers 12 may communicate with multiple groups of connected parent servers, where each group includes a primary parent server 14*a* and at least one secondary parent server 14*b*, as shown in FIG. 11.

Figure 12:
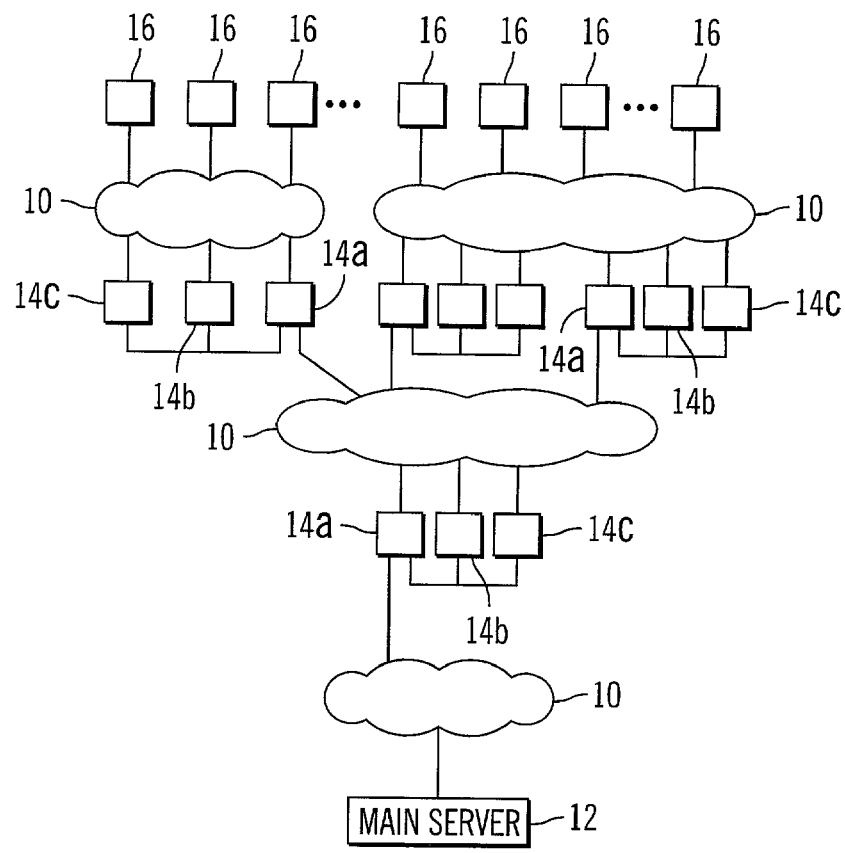
FIG. 12 is a generalized block diagram of a network architecture according to yet another example embodiment of the present invention.

Also, while the network architecture embodiment shown in FIG. 2 includes three server layers comprising a main server layer, a parent server layer and an edge server layer, other embodiments may employ more than three layers. For example, the network may include multiple layers of parent servers 14, as shown in FIG. 12, wherein a first parent server layer 90 may comprise a plurality of parent servers 14, each of which services one or more parent servers in a second parent server layer 92. The parent servers in each layer may be arranged in one or more groups, with each group having a primary parent servers connected to one or more secondary parent servers, as described above. In one embodiment, each respective parent server in the first parent server layer 90 services a respective one of the parent server groups in the second layer 92. Alternatively, or in addition, multiple parent servers in the first parent server layer 90 may service any of the parent servers in the second parent server layer 92, for redundancy and/or load balancing.

Further Delivery Operation Embodiments

Facilitating a transfer of a large file across the Internet can be expensive. Service operators may be charged for file transfers by affiliate companies that operate network components associated with the service network. Some of this expense may be reduced by employing a distributed caching system in the network, as described above. This expense may be further reduced by avoiding downloads. By distributing copies of encrypted files containing content items (for example, movies) by means other than download on the service network, the cost of the downloads may be avoided. For example, encrypted content files (such as encrypted movie files) may be distributed through mass or directed mailings, hand-outs at shopping malls or other populous locations, or other suitable distribution scheme. In addition, valuable marketing data may be derived from license purchasing from mass distribution, indicating consumer interests in such content items (for example, movies).

As noted above, distribution of copies of encrypted content items (for example, movie files) among users and potential users may be encouraged by the service operator. In one embodiment, discounts, such as coupons, may be provided to the user who distributes a copy to a second user, provided the second user purchases a license to view that copy. In addition or alternatively, the second user may be provided with a discount or coupon to encourage the second user to purchase a license for the received copy.

Other download or distribution arrangements may also be employed, such as downloading through an affiliate's website and network (for example, but not limited to, Amazon.com). Broadcasts or multicasts may also be employed, through the Internet or more conventional broadcasting, such as satellite or cable. Further direct distribution embodiments include supplying an encrypted copy of a content item (for example, movie) on a CD-ROM as a promotional with a new ISP or magazine subscription, or a computer or other product purchase. A CD-ROM may be given away as a promotional to target users, such as college students. In further embodiments, new laptop or desktop computers or electronic storage devices could be pre-loaded with one or more encrypted content items, such as movies, for example, stored on a hard drive. Furthermore, a library of multiple encrypted movies may be placed on a CD-ROM style disc.

As described above, various system and process embodiments according to the present present invention may be employed to provide a content owner or holder with a mechanism for allowing users to access the content through a network. While a preferred example model for the system and process is a movie rental system for downloading movie files to customers across the Internet, other embodiments may involve delivery of other types of content including, but not limited to, music files, still image files, game software, or other software or data. Moreover, other embodiments may employ other wide area or local area networks. Thus, the references to movie files and movie information in the above-described representative examples do not limit the intention to that context of use. Aspects of the invention described above may be employed in the delivery, rental, sale or promotion of other types of content over a network.

In addition, various business processes are described herein for providing revenue to a service operator, content supplier or owner, and various third-party sites. For example, the service operator receives revenues from user's purchasing licenses. Such revenues may be shared with content suppliers or owners of content for which licenses have been purchased. Various promotional mechanisms described herein may be employed to enhance the user's experience and encourage usage of the system, including, but not limited to coupons, discounts, gift certificates, promotional trailers and clips, promotional images on the website, and the like.

The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. A system for delivering content items over a network for download to recipient processors within a service region, the system comprising:
    a plurality of edge servers connected for communication on the network and distributed within the service region, each edge server having a storage facility for storing content items for delivery to recipient processors, wherein selected content items are stored on each edge server by applying an algorithm to determine content least frequently used, and selected content items are stored on each edge server based on a least frequently used determination so that not all available content items are stored on each edge server;
    at least one parent server connected for communication on the network, wherein the at least one parent server stores all available content items and provides content items to the plurality of edge servers, the plurality of edge servers requesting content not stored thereon from the at least one parent server; and
    at least one main server connected for communication on the network for providing an interface for receiving and processing requests for content items from recipient processors, wherein each main server is programmed or configured for directing recipient processors to edge servers to obtain requested content items.

2. A system as recited in claim 1, wherein the network comprises the Internet and the interface comprises a website supported by the at least one main server.

3. A system as recited in claim 1, wherein each edge server is programmed or configured to receive requests for content items from a recipient processor that is directed to the edge server by the main server and, in response to a request, determine whether the requested content item is stored with the edge server and, if the requested content item is not stored with the edge server, requesting the content item from a parent server.

4. A system as recited in claim 1, wherein the content items comprise digitally encoded files, each file having at least 500 Mega Bytes of data.

5. A system as recited in claim 1, wherein the content items comprise digitally encoded movie files.

6. A system as recited in claim 1, wherein directing recipient processors comprises providing recipient processors with a network address associated with at least one edge server.

7. A system as recited in claim 1, wherein directing recipient processors comprises providing a recipient processor with a uniform resource locator (URL) for locating at least one edge server, the URL also including a token which identifies a requested content item.

8. A system as recited in claim 1, wherein directing recipient processors comprises providing a recipient processor with a uniform resource locator (URL) for locating at least one edge server, the URL also including a token which identifies the recipient processor.

9. A process for delivering content items over a network for download to recipient processors within a service region, the process comprising:
   storing all available content items with at least one parent server connected on the network;
   receiving content items from the at least one parent server over the network and storing selected content items with a plurality of edge servers connected on the network and distributed within the service region, wherein the plurality of edge servers request content items not stored thereon from the at least one parent server;
   applying an algorithm to determine content items least frequently used, and storing content items on each edge server based on a least frequently used determination so that not all available content items are stored on each edge server;
   providing an interface with at least one main server connected on the network, for receiving and processing requests for content items from recipient processors; and
   directing recipient processors to edge servers to obtain requested content items in response to receiving and processing requests for content items on the at least one main server.

10. A process as recited in claim 9, wherein the network comprises the Internet and the interface comprises a website supported by the at least one main server.

11. A process as recited in claim 9, wherein directing recipient processors to edge servers comprises receiving a request at an edge servers for a content item that is directed to the edge server by the main server and, in response to the request, determining whether the requested content item is stored with the edge server and, if the requested content item is not stored with the edge server, requesting the content item from a parent server.

12. A process as recited in claim 9, wherein the content items comprise digitally encoded files, each file having at least 500 Mega Bytes of data.

13. A process as recited in claim 9, wherein the content items comprise digitally encoded movie files.

14. A process as recited in claim 9, wherein directing recipient processors comprises providing recipient processors with a network address associated with at least one edge server.

15. A process as recited in claim 9, wherein directing recipient processors comprises providing a recipient processor with a uniform resource locator (URL) for locating at least one edge server, the URL also including a token which identifies a requested content item.

16. A process as recited in claim 9, wherein directing recipient processors comprises providing a recipient processor with a uniform resource locator (URL) for locating at least one edge server, the URL including a token which identifies the recipient processor.

17. A process as recited in claim 9, further comprising determining whether recipient processors are in a specified geographic region and denying access to the requested content to recipient processors not within the specified region.

18. A process as recited in claim 9, wherein directing recipient processors to edge servers comprises determining appropriate edge servers to which recipient processors are directed by a load balancing technique.

19. A process as recited in claim 18, wherein the load balancing technique comprises a Best Distributor Selection BDI system.

20. A process for delivering content items over a network for download to recipient processors within a service region, the process comprising:
   storing content items with at least one parent server connected on the network;
   receiving content items from the at least one parent server over the network and storing content items with a plurality of edge servers connected on the network and distributed within the service region;
   providing an interface with at least one main server connected on the network, for receiving and processing requests for content items from recipient processors; and
   directing recipient processors to edge servers to obtain requested content items in response to receiving and processing requests for content items on the at least one main server; and
   controlling access by recipient processors to content items obtained from edge servers, based on payment information received and processed by at least one main server.

21. A process as recited in claim 20, wherein the network comprises the Internet and the interface comprises a website supported by the at least one main server.

\* \* \* \* \*